Dec. 30, 1969 W. W. BURR 3,487,134
METHOD FOR MANUFACTURING A TEXTURED SURFACED COMPOSITE
FOAMED ARTICLE AND THE MOLD THEREFOR
Filed Feb. 8, 1965 2 Sheets-Sheet 1

INVENTOR.
WARREN W. BURR
BY
J. B. Holden
ATTORNEY

Dec. 30, 1969  W. W. BURR  3,487,134
METHOD FOR MANUFACTURING A TEXTURED SURFACED COMPOSITE
FOAMED ARTICLE AND THE MOLD THEREFOR
Filed Feb. 8, 1965  2 Sheets-Sheet 2

INVENTOR.
WARREN W. BURR
BY
J. B. Holden
ATTORNEY

# United States Patent Office 3,487,134
Patented Dec. 30, 1969

3,487,134
METHOD FOR MANUFACTURING A TEXTURED SURFACED COMPOSITE FOAMED ARTICLE AND THE MOLD THEREFOR
Warren W. Burr, Akron, Ohio, assignor to The Goodyear Tire & Rubber Company, Akron, Ohio, a corporation of Ohio
Continuation-in-part of application Ser. No. 355,015, Mar. 26, 1964. This application Feb. 8, 1965, Ser. No. 430,987
Int. Cl. B29h 7/20; B29c 9/00
U.S. Cl. 264—45     5 Claims This invention is a continuation-in-part of application Ser. No. 355,015, filed Mar. 26, 1964.

This invention relates to a method for making foamed articles wherein the skin is formed with the desired design embossed thereon and to the article per se. More particularly, it relates to a method for making a film having a flat or non-specular surface, and to said film and to the articles made therefrom.

When making a foamed article according to one commercial method, it is necessary to first form a sheet and then shape the sheet by vacuum forming to obtain a skin having the desired design embossed thereon before adding the foamable mixture or foam.

Where the skin of articles such as crash pads, seat cushions and arm rests have been made by vacuum forming and then further treated to produce a flat or non-specular surface, the resulting surface is easily scratched or scuffed to give an undesirable mark-off or scratched appearance to the surface.

It is an object of this invention to provide a method for producing the film having the contour desired and also simultaneously embossing on the film the desired design and/or surface non-specular effect. This shaped and embossed film can be used to produce a foamed article which has the foam and film integrally connected.

The objects of this invention may be obtained by forming a mold or film forming surface containing the desired design and/or non-specular effect; then applying to the surface of the mold or film forming surface a coating of a suitable film forming material as hereinafter described; allowing the coating of film forming material to set to form a skin or film; and then adding to the mold or film forming surface the desired amount of a liquid polyurethane foamable reaction mixture or other suitable foam forming material, allowing the material added to expand and set in contact with the skin to form the desired foamed article, then the article is removed from the mold to expose the cellular article having a skin containing embossed thereon the desired design or non-specular effects.

The nature of this invention may be more readily ascertained by reference to the drawings wherein.

Figure 1:
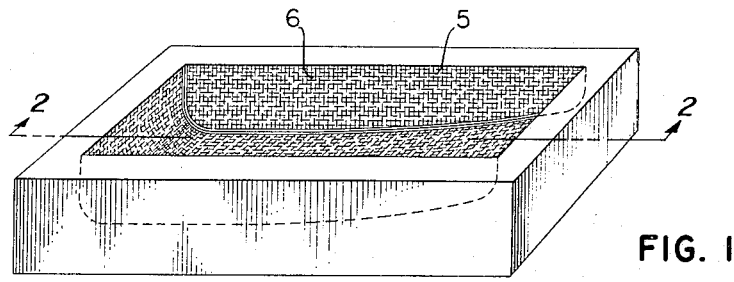
FIG. 1 is a perspective view of a female mold.
Figure 2:
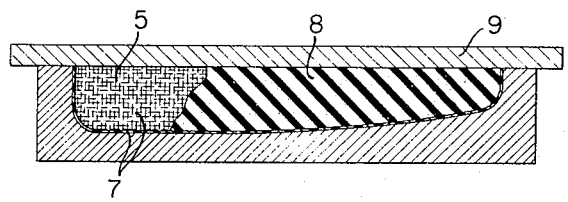
FIG. 2 is a cross sectional view through FIG. 1 along the lines 2—2 showing in partial section the mold containing a polyurethane skin with foamed polyurethane integrally connected therewith.

Reference to FIG. 1 discloses this mold has a cavity 5 which has the design 6 etched or embossed on the surface of the cavity. Where the mold is a metal such as aluminum it is necessary to apply a mold releasing agent over the surface of the mold to prevent the liquid polyurethane reaction mixture from adhering thereto. Suitable releasing agents are well known but polyethylenes, waxes and silicones are the preferred releasing agents.

On the other hand, where the mold or film forming surface is made of a polyolefin or other material to which the liquid polyurethane reaction mixture or film forming material does not adhere, there is no need to coat the mold surface with a releasing agent.

To illustrate this, a polyethylene mold of the type shown in FIG. 1 was coated with sufficient liquid polyurethane reaction mixture to form a skin of about 0.003 to 0.070 inch and preferably 0.005 to 0.020 inch when the reaction mixture has reacted and set. The coating of the mold is done preferably by spraying on the liquid polyurethane reaction mixture.

With the skin or film 7 formed on the surface of the mold cavity sufficient liquid polyurethane foamable reaction mixture is added and spread over the surface of the mold cavity to give the desired amount of foam 8. Usually it is desirable to use at least enough liquid polyurethane foamable mixture to at least fill the cavity after the foamable mixture has foamed.

In some cases it is desirable to have a cover 9 on the mold. This cover may be of the fixed type or it may be of the floating type which permits the excess foam to overflow from the mold.

Figure 3:
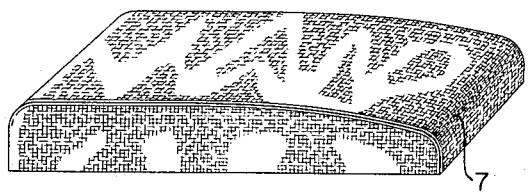
FIG. 3 is a perspective view of the finished foam article.

The product is then heat cured as normally practiced in the current art of manufacturing polyurethane products, especially keeping in mind that added heat improves the physical properties of the urethane by heating the product at about 100 to around 200° F. for about 10 minutes or more. The finished molded arm rest is best seen in FIG. 3.

Figure 4:
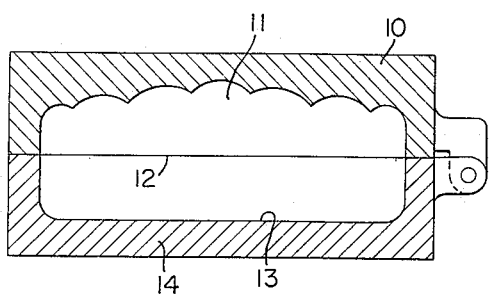
FIG. 4 shows a cross section through two female mold parts juxtapositioned to give an article having the contour shown in this cross section.
Figure 5:
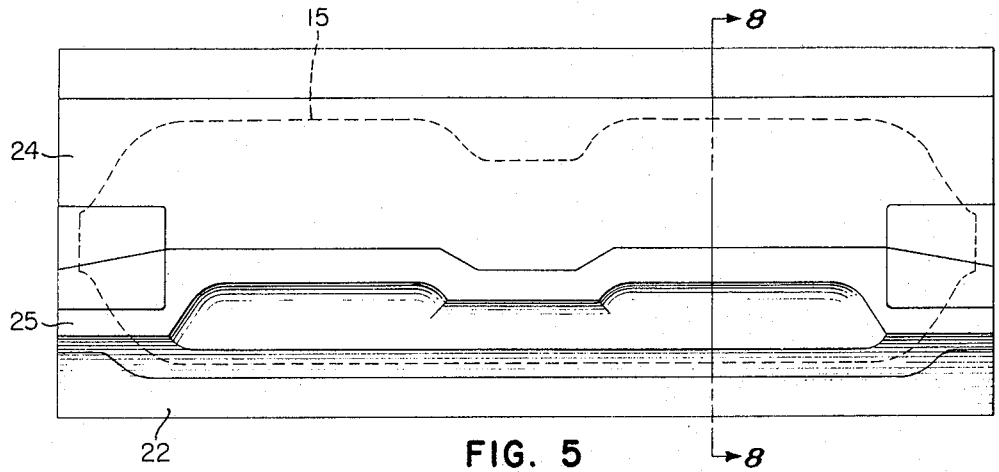
FIG. 5 is a top plan view of a "crash-pad" mold.

In FIG. 4, the cover 10 has a cavity 11 therein to permit articles to be formed which do not have a flat face on one side. It should be appreciated that the article formed in the mold of FIG. 4 will have a seam 12 where the two mold halves meet.

The liquid polyurethane reaction mixture usually comprises an organic polyisocyanate, a reactive hydrogen containing material and a cross-linking agent and sufficient solvent to permit the mixture to be readily applied. The amount of solvent may vary from none to as high as 50% by weight or more. In normal practice it is preferred to keep the solvent below about 30% and preferably less than 20%. Suitable solvents are those normally used for alkyd resins and boiling below about 250° F.

Examples of suitable representative solvents are methyl ethyl ketone, toluene, benzene, nitropropane, the chlorinated hydrocarbons, etc.

It should be appreciated that the reactive hydrogen containing polymeric materials are generally divided into the broad classes of polyester polyols and the polyether polyols with the polyester amides being considered by some people as a special case of the polyester materials. Another class of the reactive hydrogen containing polymeric materials are the hydrocarbon polyols such as the hydroxyl terminated polyolefins.

Representative members of the reactive hydrogen containing polymeric materials belonging to the above classes which are useful in this invention are the polyester polyols prepared by reacting the aliphatic polycarboxylic acids such as oxalic, malonic, succinic, glutarate, adipic, suberic, sebacic, and azalaic with a polyol such as a glycol. Also the unsaturated aliphatic polycarboxylic acids such as maleic and fumaric may be used.

In general, by the term "aliphatic polycarboxylic acid" we mean those carboxylic acids having from 2 to about 20 carbon atoms and preferably about 6 to 12 with the number of carboxyl groups varying from about 2 to 3 and in some cases as high as 4 or 5. Also, the aromatic polycarboxylic acids may be used.

Representative examples of these aromatic polycarboxylic acids are phthalic, terephthalic and isophthalic acid.

These polycarboxylic acids are reacted with glycols or polyols to form polyesters containing at least 2 hydroxyls though for some uses some triols and higher may be used to stiffen the product or to reduce its flexibility. Normally, where a solid polyurethane is to be formed it is preferred that the acid number of the polyester be relatively low, normally less than about 10 and preferably less than 1.

Representative examples of the polyols useful in the preparation of the polyesters are ethylene glycol, propylene glycol, tetramethylene glycol, pentamethylene glycol, decamethylene glycol, trimethylol propane, triethylol propane, glycerine, pentaerythritol, hexane triol, sorbitol and related polyols having from 2 to about 10 carbon atoms and containing from 2 to 8 hydroxyls.

Representative of the hydroxyl terminated polyethers useful in this invention are polyethylene glycol, polypropylene glycol, polytetramethylene ether glycol and the corresponding polyols having 3, 4, 5 and higher hydroxyls formed by the condensation of alkylene oxides containing from 2 to about 10 or more carbon atoms on a nucleus generating material such as trimethylol propane, glycerine, hexane triol, pentaerythritol and sorbitol. In general, where elastomeric polyurethanes are prepared it is the practice to use a reactive hydrogen containing polymeric material having a molecular weight of about 500 to about 8000 with the preferred molecular weight range being about 1500 to 3000. Also, those skilled in the art appreciate that the use of appreciable amounts of tri- and higher functional polyols lead to appreciable chain crosslinking and certain properties whereas the use of essential difunctional polyols yields a material having essentially a linear structure with some difference in properties.

Any suitable organic polyisocyanate may be utilized in the process of this invention, such as, for example, the following aliphatic ones: hexamethylene diisocyanate, undecamethylene diisocyanate, dodecamethylene diisocyanate and 3,3'-diisocyanate dipropylether; cyclopentylene-1,3-diisocyanate, cyclohexylene-1,4-diisocyanate; and the following aromatic ones: the tolylene diisocyanates, the xylylene diisocyanates; 4,4'-diphenylmethane diisocyanate, 2-nitrodiphenyl-4,4'-diisocyanate, 4,4'-diphenyl propane diisocyanate, p-isocyanato benzyl isocyanate, m-phenylene diisocyanate, p-phenylene diisocyanate, naphthylene - 1,4-diisocyanate, 3,3'-dimethyl-4,4'-diphenylenediisocyanate, p,p',p''-triphenyl methane tri-isocyanate and diphenyl-4,4,4'-triisocyanate, the polyaryl polyisocyanates and the polyalkylaryl polyisocyanates. The aromatic diisocyanates are, however, preferred. The organic polyisocyanates are used in excess, usually at least about 1.1 mols and higher for each mol of reactive hydrogen-containing polymeric material. The preferred range generally is about 1.5 to about 2 mols of polyisocyanate based on the reactive hydrogen-containing polymeric material. The excess polyisocyanate is reacted with a suitable crosslinking material such as water, glycols, amino alcohols and the primary diamines. Normally the crosslinker is used in an amount equivalent to the excess polyisocyanate. When water is used it should be appreciated that the resulting product will be porous unless steps are taken to remove the carbon dioxide generated in situ. Where the glycols and diamines are used as the crosslinking agent, the resulting product will be a homogeneous plastic. The preferred glycol for use as a crosslinking agent is butane diol, although representative examples of those listed for making the polyesters may be used, too.

The crosslinkers usually are used in the amount of about 0.1 to about .9 mol per mol of excess organic polyisocyanate over that equivalent to the polyester or polyether.

Preferred results are obtained when the amount of diamine crosslinker is about 0.3 to 0.8 mol based on the excess organic polyisocyanate. Representative examples of suitable primary diamines where conventional techniques are to be used, are the so-called slow diamines such as methylene bis-(ortho-chloroaniline), ortho-dichlorobenzidine, 4,4'-bis (amino phenyl) sulfone. Representative examples of suitable fast primary diamines are 4,4'-methylene dianiline, methyl tolidine, tolylene diamine, o-tolidine, o-dianisidine. The fast diamines preferably are dissolved in a suitable solvent before use such as the low boiling hydrocarbons and ketones.

The term "fast and slow diamines" refers to the time required for a boiling half molar solution of the diamine to develop a turbidity when mixed with a half molar boiling solution of the polyisocyanate. Where methylene chloride is the solvent a fast diamine develops a turbidity in at least 25 seconds.

The liquid polyurethane foamable reaction mixture may be essentially the same as the liquid polyurethane reaction mixture except the solvent should be of the low boiling type such as butane, pentane, pentene, butene, the halogenated hydrocarbons boiling below about 200° F. such as methylene chloride and trichloro fluoro methane and the crosslinker should be water. Also, carboxylic terminated polymers may be used instead of the hydroxyl terminated ones.

The following examples illustrate the invention without, however, limiting (all parts are by weight unless otherwise indicated):

EXAMPLE I

A pillow having the contour shown in FIG. 4 was made by spray coating the surfaces 11 and 13 of the polyethylene mold with a liquid polyurethane reaction mixture.

The liquid polyurethane reaction mixture used in this example was prepared from a prepolymer. This prepolymer was prepared by reacting 6 moles of toluene diisocyanate with 2 moles of a polyester prepared by the condensation of adipic acid with an excess of a mixture consisting of 80% ethylene glycol and 20% propylene glycol and 1 mole of a polyester prepared by the condensation of adipic acid with an excess of butane diol.

This prepolymer was used to prepare a black masterbatch by mixing 240 parts of this prepolymer with 142 parts of carbon black, 86 parts of Cellosolve acetate and 377 parts of methyl ethyl ketone.

A cement was made by mixing a mixture of 51 parts of a 10% solution of cellulose acetate butyrate in methyl ethyl ketone, 39 parts of submicroscopic silica (Cab-O-Sil) with a well dispersed mixture of 389 parts of Cellosolve acetate, 220 parts of methyl ethyl ketone and 82 parts of the above mentioned black masterbatch.

Component 1 of the spray mixture was formed by mixing 349 parts of the above cement with 548 parts of the above mentioned prepolymer.

Component 2 of the spray mixture was made by mixing 199 parts of MDA with 538 parts of methyl ethyl ketone.

Components 1 and 2 were mechanically metered in the proportions to give about 0.7 to 0.9 mole of MDA for each mole of excess toluene diisocyanate over that equivalent to the polyester and were mixed continuously and then were sprayed. The continuous metering, mixing and spraying equipment is preferred with MDA and the other fast crosslinkers since the mixture of components 1 and 2 remains sprayable for less than 10 minutes, normally.

Then sufficient liquid polyurethane foamable reaction mixture was added to at least fill the cavity of the mold when foaming is completed. After the liquid polyurethane foamable reaction mixture was spread on surface 13 of the bottom mold cavity, the top part 10 of the mold was lowered to rest on bottom part 14.

The liquid polyurethane foamable reaction mixture was formed on a pressure mixing machine with the following recipe:

| | |
|---|---:|
| A mixed polyol [1] | 100.00 |
| Toluene diisocyanate mixture of 80%, 2,4 and 20% 2,6-isomers | 53.00 |
| Water | 4.00 |
| Triethylene diamine-catalyst | .20 |
| N-ethyl morpholine-catalyst | .50 |
| GE #1034 Silicone Fluid—foaming agent | 2.50 |
| Stannous octoate—catalyst | .15 |
| Freon 11 | 6.00 |

[1] 75% by weight of a polyether triol produced by condensing propylene oxide on one molecule of hexane triol to give a molecular weight of 4000 and 25% of a polypropylene ether glycol having a molecular weight of 2000.

EXAMPLE II

Other foam articles such as arm rests were made according to the procedure of Example I using the following prepolymers to form the spray mixture and with the addition of water instead of diamine to form the liquid foamable polyurethane reaction mixture:

Prepolymer A

A reaction product of 2 mols of tolylene diisocyanate with about 1 mol of a polyester formed by condensing an excess of ethylene glycol with adipic acid.

Prepolymer B

Same as Prepolymer A except the mol ratio used was 1.1 to 1.

Prepolymer C

Same as Prepolymer A except propylene glycol was used to produce the polyester.

Prepolymer D

Same as Prepolymer A except methylene diphenylene diisocyanate was used instead of toluene diisocyanate.

Prepolymer E

The same as Prepolymer C except methylene diphenylene diisocyanate was used instead of toluene diisocyanate.

Prepolymer F

The reaction product of 2 mols of toluene diisocyanate with 1 mol of a poly tetramethylene ether glycol having a molecular weight of about 3000. This prepolymer was preferred for the exposed polyurethane coating as it had greater resistance to degradation.

EXAMPLE III

An arm rest from a 1964 car was covered by spray coating with an aqueous dispersion of a polyethylene having a melting point of about 110° F. Then a silicone spray mixture prepared by mixing 200 parts of a silicone molding rubber (Silastic RTV containing 4% of Dow Catalyst 588) and 50 parts of methyl ethyl ketone was sprayed over the coating of polyethylene on the arm rest. Sufficient silicone rubber was sprayed over the arm rest to give a spray coat of one-eighth to one-fourth inch. The silicone rubber was cured and then stripped from the arm rest to obtain a mold having the contour and surface embossing found on the arm rest.

The cavity of this silicone rubber mold was then spray coated with the liquid polyurethane reaction mixture of Example I to give a skin of about 0.008 inch. Then sufficient foamable polyurethane reaction mixture was added to fill the cavity with foam. The reaction mixtures were allowed to cure at room temperature—ca. 75° F.—before the finished arm rest was removed from the mold.

The silicone rubber molds offer certain advantages as their flexibility allows the surface of the mold cavity to be more readily coated. Also, when using the silicone rubbers to make the mold it is desirable to give the mold a fabric backing—preferably the fabric is of the extensible type—as this permits the mold to be put under stress to make the surface of the cavity more accessible for spray coating.

EXAMPLE IV

A commercial crash pad was painted with a flat paint to give the polyvinyl chloride skin a flat or non-specular appearance. It should be noted this painted skin exhibited the phenomenon of "mark-off" viz. the surface was disfigured by the scratch of the fingernail to give either a dull or burnished appearance.

This painted crash pad was used as a pattern to form a negative or mold 15 having the surface effect of the painted crash pads. The negative was formed by spray coating the flat paint crash pad with a methyl ethyl ketone dispersion of a silicone molding rubber, i.e. the dimethyl silicone rubber. Then an expansible net fabric 16 was placed over the first coat 17 of silicone molding rubber to reinforce the mold.

The fabric was covered with a further coat 18 of silicone molding rubber and cured to complete the negative or mold.

Figure 7:
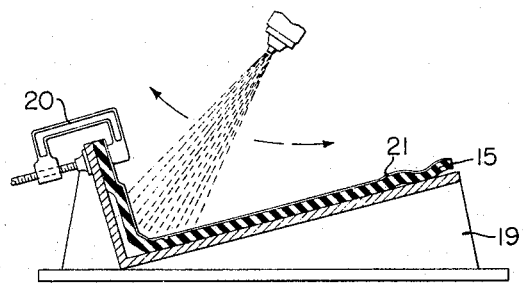
FIG. 7 is a jig or support to hold the flexible mold in a spread apart relationship while the skin is being sprayed on the surface of the mold.
Figure 6:
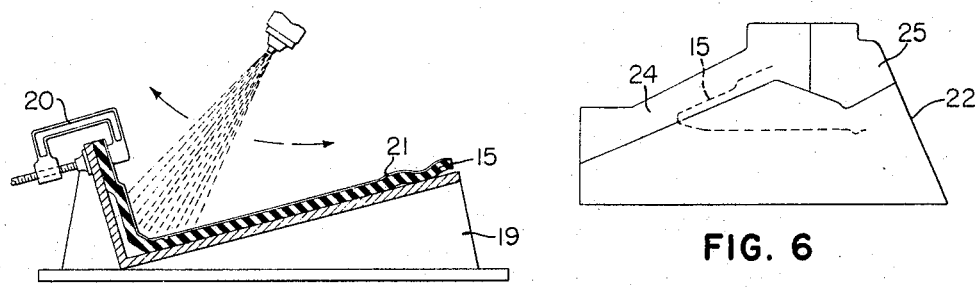
FIG. 6 is an end view in elevation of the mold of FIG. 5.
Figure 8:
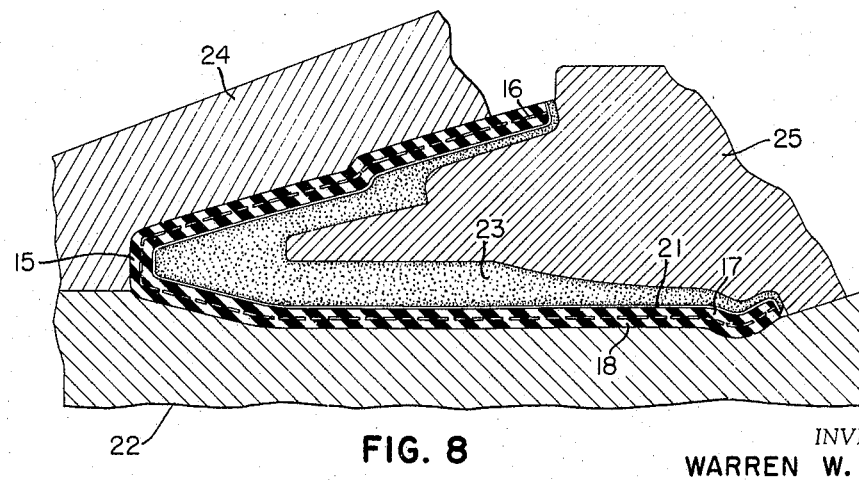
FIG. 8 is a cross section through FIG. 5 along the line 8—8.

This negative mold 15 was removed from the painted crash pad and placed in the jig 19 and fastened with clamp 20 in the position shown in FIG. 7. By clamping the negative mold in the position shown in FIG. 7 it is possible to more readily apply the sprayable polyurethane reaction mixture to form the skin 21. With the polyurethane skin formed in the negative mold, the negative mold is placed inside the three part rigidizing mold 22. Then sufficient foamable polyurethane reaction mixture is added and allowed to foam to fill the skin with foam 23 as shown in FIG. 8. Before the foaming is complete, it is desirable to close the mold by placing the parts 24 and 25 in the position as shown in FIGS. 6 and 8. After the foam has cured the mold is opened by removing parts 24 and 25 to permit the finished crash pad to be removed therefrom. The finished crash pad has a skin which is flat or non-specular and that does not exhibit the phenomena of "mark-off" when scratched with the finger nail.

EXAMPLE V

In a modification of the procedure of Example IV the skin or film 21 was laid down in three spray coats. The first spray coat used a liquid polyurethane reaction mixture which was clear and free of pigments. The second coat was a spray coat of a conventional paint which was compatible with the polyurethane. The third spray coat was laid down over the spray coat of paint to give a laminated skin. This skin was then converted into a foam article in accordance with the procedure of Example IV.

The technique of this example is particularly advantageous where color matching is a problem. For instance, in the automotive manufacture alkyl, acrylic and vinyl pigments may be used to avoid matching the pigmentation of the polyurethane.

Other elastomeric materials, for example, rubber latices, vinyl organisols, sulfonated polyethylene, may be used to build the film but they require special handling to remove the water or to fuse the plasticizer.

By this invention it is possible to get non-specular films having a paint finish or appearance referred to as satin, eggshell, flat, velvet or suede.

While certain representative embodiments and details have been shown for the purpose of illustrating the invention, it will be apparent to those skilled in this art that various changes and modifications may be made therein without departing from the spirit or scope of the invention.

What is claimed is:

1. A method for making a foamed article having an integral skin of the desired grain and txeture effects comprising the steps of:
(1) forming a skin by applying at least three coats of skin-forming material to the surface of a mold having the desired design features thereon, with the first and last coat comprising a polyurethane reaction mixture and at least one coat between the first and last coat comprising a coat of compatible paint to give the film the desired pigmentation,
(2) adding a liquid polyurethane foamable reaction mixture to the mold and allowing said foamable mixture to foam and set in contact with the coat of polyurethane, and
(3) removing the cured article from the mold.

2. A method of producing a non-specular film comprising:
(1) painting the surface of a pattern capable of forming a specular surface with a suitable paint to produce a non-specular surface on said pattern;
(2) covering the non-specular surface with an elastomeric material to produce a mold having the surface texture and shape of the pattern;
(3) removing the cured elastomeric material from the pattern to obtain the mold;
(4) coating the surface of the mold with a film-forming material to produce a film when cured having the shape and surface texture of the pattern; and
(5) removing the cured film from the mold to obtain the shaped film having a non-specular surface.

3. The method of claim 2 wherein a material is foamed in place and adhered to said film prior to step 5.

4. A method of forming a mold which will yield an article having a surface of a non-specular nature comprising:
(1) painting the surface of a pattern capable of forming a specular surface with a paint to produce a non-specular surface on the pattern,
(2) covering the non-specular surface of the pattern with an elastomeric material to produce a negative mold, and
(3) removing the cured elastomeric material from the pattern to obtain the negative mold.

5. The method of claim 4 wherein the elastomeric material is a silicone molding rubber.

References Cited

UNITED STATES PATENTS

| | | | |
|---|---|---|---|
| 2,083,484 | 6/1937 | Zampol | 117—5.1 |
| 2,618,032 | 11/1952 | Traenkner | 117—5.1 |
| 1,876,432 | 9/1932 | Phillips | 264—255 XR |
| 2,113,166 | 4/1938 | Zinser | 264—220 XR |
| 2,232,551 | 2/1941 | Merton | 264—220 XR |
| 2,744,340 | 5/1956 | Gerber | 264—45 XR |
| 2,851,733 | 9/1958 | Pangonis et al. | 264—291 |
| 3,078,505 | 2/1963 | Mitten | 264—45 XR |
| 3,098,262 | 7/1963 | Wisotzky | 264—299 XR |

FOREIGN PATENTS

| | | |
|---|---|---|
| 664,192 | 6/1963 | Canada. |
| 910,681 | 11/1962 | Great Britain. |

OTHER REFERENCES

Dombrow, B. A.: Polyurethanes, New York, Reinhold, 1957, pp. 106–113. (Reinhold Plastics Applications Series.)

Dow Corning Corp. Bulletin, "Greater Versatility in Design and Production With Silastic RTV," Midland, Mich., © 1961, all pages.

PHILIP E. ANDERSON, Primary Examiner

U.S. Cl. X.R.

5—337; 161—160; 260—2.5; 264—54, 219, 226, 255, 299; 296—153; 297—390